June 23, 1964

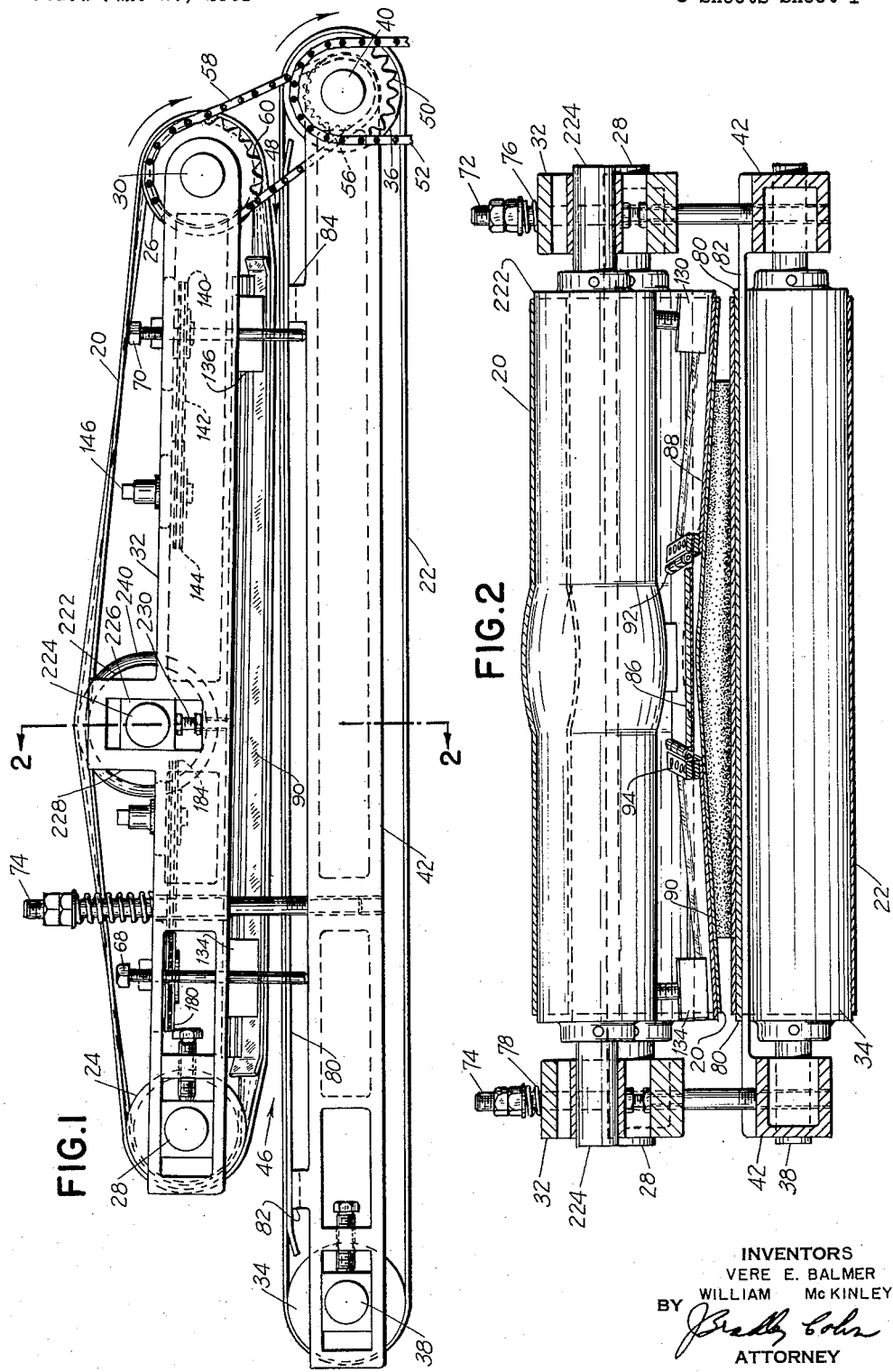

V. E. BALMER ETAL 3,138,120

DOUGH MOLDING DEVICE

Filed June 20, 1961

INVENTORS
VERE E. BALMER
WILLIAM McKINLEY
BY
*Bradley Cohn*
ATTORNEY

June 23, 1964    V. E. BALMER ETAL    3,138,120
DOUGH MOLDING DEVICE

Filed June 20, 1961    3 Sheets—Sheet 3

INVENTORS
VERE E. BALMER
WILLIAM McKINLEY
BY Bradley Cohn
ATTORNEY

United States Patent Office 3,138,120
Patented June 23, 1964

3,138,120
DOUGH MOLDING DEVICE
Vere E. Balmer, Wellsville, Pa., and William McKinley, Fairfield, Conn., assignors to American Machine & Foundry Company, a corporation of New Jersey
Filed June 20, 1961, Ser. No. 118,380
8 Claims. (Cl. 107—8)

This invention represents an improvement in dough molding machines of the type disclosed, for instance, in Patent No. 2,881,715, granted to John M. Heim, April 14, 1959, which machines are employed for rolling dough strings or noodles particularly those which are thereafter shaped into pretzels by a tying operation performed in such a machine as is disclosed in Patent 2,629,340, granted to H. G. Allen et al., filed February 24, 1953.

There has developed an increased demand for pretzels in diversified shapes and sizes. Pretzels are now being made of noodles in a wide range of diameters. Some are uniform in diameter, while many are larger in diameter in their middle portions and taper toward their extremities. Pretzels, as is generally well known, are relatively inexpensive edible baked items. The continued economical production of pretzels in the variety of presently popular shapes and sizes imposes a requirement for flexibility in forming the dough into properly shaped noodles and delivery to the pretzel tying mechanism at substantially the same high rate of speed presently prevailing in the industry in the manufacture of pretzel noodles of uniform cross sections and diameters. The high speed rolling of elements of uniform diameter and progressive delivery in the direction of the line of motion of the rollers is a relatively simple operation as compared with the rolling and progressive delivery of elements which are required to be tapered. The more acute the taper, the more difficult the problem.

The difficulty arises out of the tendency of the peripheries along the longitudinal axis of the tapered element, which have differing cross sections, to rotate at different rates of speed. The sections of lesser diameter located toward the smaller end of the taper tend to rotate faster and to swing the noodle out of its proper position at right angles to the direction of motion of the rolling belt or to move the noodle transversely on the belt out of proper alignment with the pocket of the rotatable transfer or pick-up bar of the tying mechanism which receives it at the end of the roller. This twisting and transverse slippage in tapered noodles have been minimized by providing a noodle having a central portion of large uniform diameter flanked by equal frustums. However, this measure is not completely effective in providing continuous, uninterrupted high speed delivery to the tying mechanism unless the original dough mass is properly positioned transversely on the intake rollers at the head end of the noodle rolling mechanism.

An object of the invention is the improvement of rolling machines which roll dough pellets into noodles which are later tied into pretzels.

Another object of the invention is to insure the positive feed of a dough pellet of any size, within a range, between the rolling belts of noodle forming mechanisms.

Another object of the invention is the pre-forming of dough pellets prior to the start of actual rolling of noodles therefrom.

Another object of the invention is to improve the accuracy and uniformity of the timing of the rolling operation from the time of delivery of a dough pellet at the intake of the rolling mechanism to the time of delivery of the rolled noodle to the pretzel tying mechanism.

Another object of the invention is to standardize the path of travel of the noodle between the rollers from the intake to the delivery position by keeping it almost exactly centered transversely on the rollers to promote higher production speeds.

Another object of the invention is to eliminate the drag, or time delay, at the discharge end of the noodle forming mechanism particularly on tapered noodles having large centers as they pass from the rolling belts to the noodle receiver on the tying mechanism.

A feature of the invention is an intake roller having a central concave section for receiving the dough pellet at the intake.

Another feature of the invention is an output roller having a central concave section, somewhat longer than the concave section of the intake roller to aid in properly orienting the noodle at the output end of the rolling mechanism.

Another feature of the invention is a roller located intermediate the input and output rollers and having a convex central section to take up the slack which would be otherwise introduced in the endless belt between the concave sections of the input and output rollers. This convex section on the intermediate rollers engages the inner surface of the coacting endless belt to draw the endless belt taut. The intermediate roller engages only one transverse section of one run of the continuous belt, on a portion of the outer periphery of the roller.

The invention may be understood from the following description when read with reference to the associated drawings which taken together disclose a preferred embodiment in which the invention is presently incorporated. It is to be understood, however, that the invention may be incorporated in other embodiments and practiced in other forms which may be suggested to those skilled in the art by the present disclosure.

In the drawings:

FIG. 1 is a side elevation of the pretzel noodle rolling apparatus;

FIG. 2 is a sectional end elevation taken on line 2—2 of FIG. 1;

Figure 3:
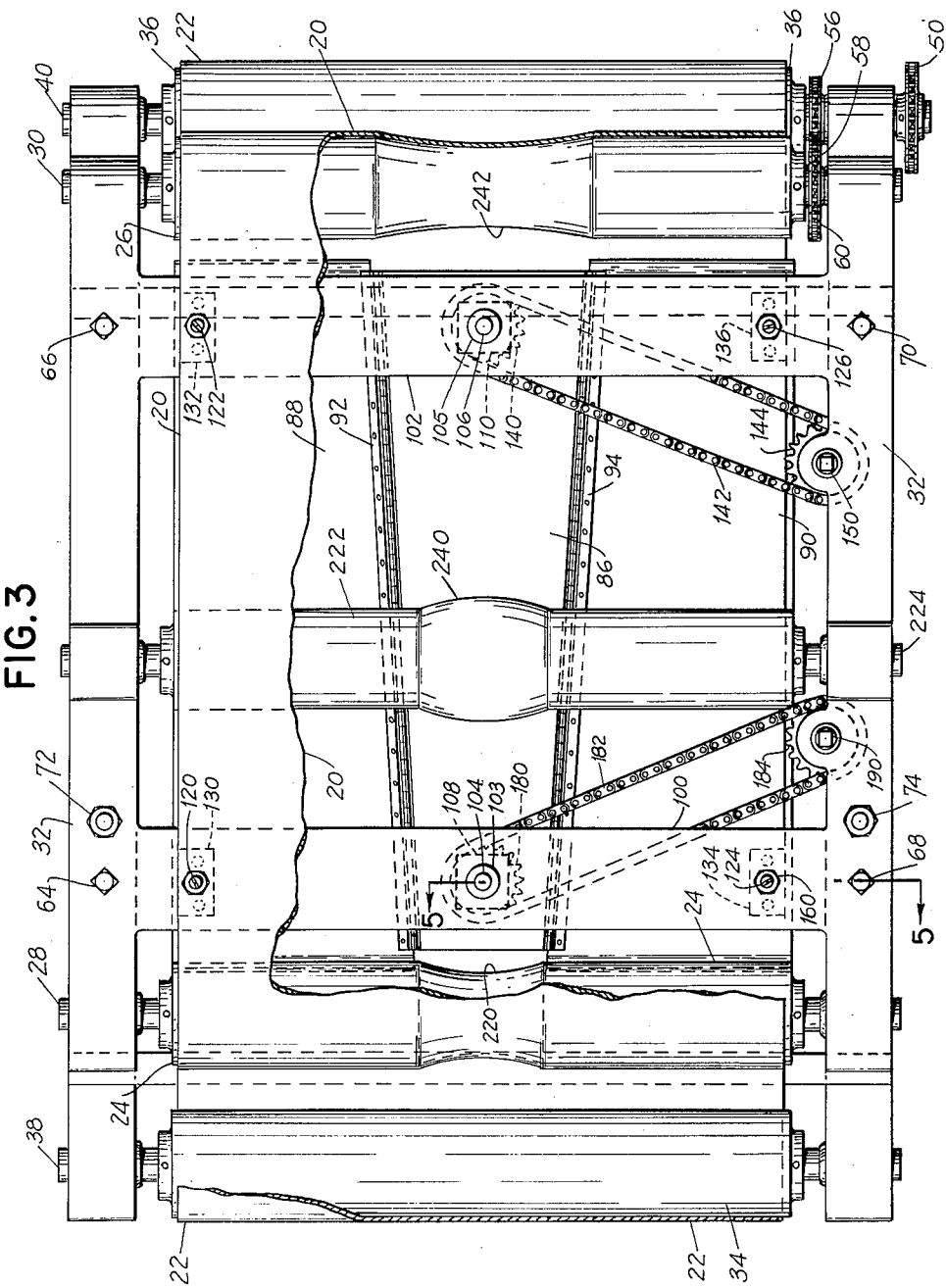
FIG. 3 is a plan view of the pretzel noodle rolling apparatus with a portion of the upper run of the upper belt broken away.

Refer now to FIGS. 1, 2 and 3. The noodle rolling apparatus consists of a pair of wide endless molding belts 20 and 22. Upper belt 20 is supported by rollers 24 and 26 which are secured to shafts 28 and 30 rotatably supported by a frame 32. The lower belt 22 is supported on rollers 34 and 36 mounted on shafts 38 and 40 which are rotatably supported in frame 42. Frame 32 overlies frame 42 throughout substantially the entire length of frame 42 and the lower run of upper belt 20 is spaced slightly above the upper run of lower belt 22. The spacing between these runs is slightly greater at the input end or dough pellet receiving station 46 than at noodle output station 48. Shaft 40 carries a sprocket 50 which is constantly driven by a chain 52 from a power source, not shown. To shaft 40 is also secured a sprocket 56 which, by means of a chain 58, drives a sprocket 60 on shaft 30 which constitutes the driving means for the upper endless belt 20. Sprocket 60 is of larger diameter than sprocket 56 and consequently roller 26 rotates and drives belt 20 at a slower rate than roller 36 drives belt 22. Because of the arrangement of the sprocket and the drives, both belt 20 and belt 22 are driven in a clockwise direction as indicated by the arrows in FIG. 1. The lower run of belt 20 travels from right to left and the upper run of belt 22 travels from left to right as seen in this figure. The noodle which is rolled between the two belts will, therefore, be molded by the transverse shape of belt 20, as established by its underlying adjustable rolling panels, to be described hereinafter. Because of the differential in speeds of the two belts and the slower speed of upper belt 20, this belt actually serves as a roller on which the noodle is formed. Further, because of the difference in speeds of the two belts, a dough pellet delivered at the intake 46 on the rolling mechanism will actually be transported by the lower belt 22 and delivered through the output 48. A dough pellet placed on the upper surface of the upper run of belt 22 at the intake 46 will tend to move progressively toward the output 48 of the rolling mechanism. During its progress between the two points, the coacting surfaces of the two belts will rotate the pellet counterclockwise and form it between the belts into a contour determined by the shape of the cross section of the space between the two belts. The upper surface of lower belt 22 remains in a horizontal plane as indicated on FIG. 2. The lower surface of belt 20 may be shaped by means of adjustable elements to provide a pretzel noodle of required formation.

One means of adjustment of the spacing between the upper and lower frame is a group of four screws 64, 66, 68, 70 which coact with individual nuts fixedly secured to the upper flanges of upper frame 32, near the four corners thereof, and the bottom of each of which engages the top surface of frame 42, to form, as it were, four legs on which the top frame 32 rests. As screws 64, 66, 68 and 70 are turned, the individual corners of upper frame 32 may be raised or lowered as required. Frames 32 and 42 are interconnected and held in longitudinal and transverse alignment, by means of vertical threaded studs 72 and 74 which are screwed into threaded apertures in the lower frame 42, as shown in FIG. 2, and project through openings in the upper frame 32. Helical springs 76 and 78 are confined between the upper surface of frame 32 and washers underlying nuts near the tops of studs 72 and 74, respectively, to permit limited vertical movement of upper frame 32 during the rolling operation, by compression and elongation of springs 76 and 78.

Figure 5:
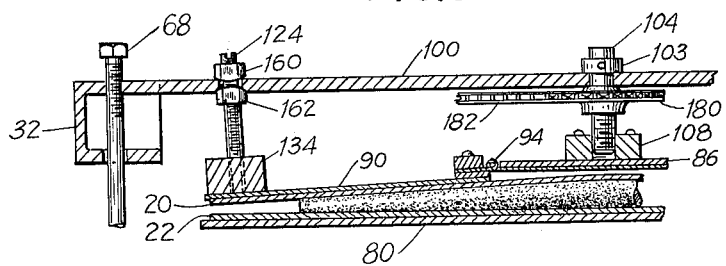
FIG. 5 is a partial end elevation taken on line 5—5 of FIG. 3.

Belt 22 is supported during its upper traverse by a horizontal table top or panel 80, which underlies belt 22. The panel 80 is supported on transverse plates 82 and 84 integral with lower frame 42. The upper belt 20 during its lower traverse is tensioned by the adjustable upper noodle rolling table, which comprises three panel sections, a flat truncated wedge shaped central panel section 86, which increases in width from left to right as shown in FIG. 3 and abutting lateral panel sections 88 and 90, which are connected to central section 86 by means of hinges 92 and 94, respectively. The central section 86 is secured to two transverse plates 100 and 102, which plates are integral with frame 32, by means of two threaded studs 104 and 106, which project through plates 100 and 102, respectively, and engage in an internally threaded boring in each of blocks 108 and 110, respectively, which latter are riveted to section 86. Studs 104 and 106, together with their respective integral caps 103 and 105, afford means for adjusting the vertical position of the central section 86 and of the hinges 92 and 94 by means to be described hereinafter. The hinges in turn afford means of adjusting the vertical level of the longitudinal edges of sections 88 and 90 abutting section 86. The vertical level of the outer edge of section 88 is adjustable by means of two screws 120 and 122 and the vertical level of the outer edge of section 90 is adjustable by means of two screws 124 and 126. Screw 124, for instance, as shown in FIG. 5, projects through a somewhat enlarged aperture in transverse plate 100, to prevent binding, and is provided with a pair of coacting nuts, such as nuts 160 and 162, abutting the opposite surfaces of the transverse plate 100. Screw 124 engages an internally threaded boring in block 134. The block 134 may be riveted to section 90 near the outer corner thereof. As screw 124 is turned, block 134 and the lower left-hand corner of section 90 may be raised or lowered as desired. Screws 120, 122 and 126 control their respective coacting elements in a corresponding manner which may be understood from the foregoing.

An individual sprocket is fixedly secured to each of studs 104 and 106, such as sprocket 180 fixedly secured to stud 104, as shown in FIGS. 3 and 5. Each of these sprockets is connected by means of an individual chain, such as chain 182, to another individual sprocket, such as sprocket 184, which is fixedly secured to a stud, such as stud 190, which is rotatably mounted in the upper front flange of upper frame 32, as shown in FIG. 3. The upper portion of each of the studs, such as stud 190, is shaped so that it may be grasped conveniently by a handle or wrench and rotated, rotating sprocket 184, driving chain 182, which in turn rotates sprocket 180 thus raising or lowering center section 86 and the inner abutting edges of sections 88 and 90. By these means the levels of sections 86, 88 and 90 may be adjusted as required for the proper rolling of noodles of differing sizes and conformations. It is particularly pointed out that the cross section of the space included between the lower run of the upper endless belt and the upper run of the lower endless belt may be adjusted within a considerable range of shapes and sizes by the apparatus described in the foregoing.

Experience in the operation of noodle rollers presently employed in the industry has disclosed that, due to the change in size and shape of the rolled noodle, production tends to be reduced by irregularities in delivery of the rolled noodle to the receiving pockets of the pick-up bar of the pretzel tying mechanism. Pick-up bar P is shown in cross section in FIG. 4. The operation of the pretzel tying machine is described in detail in Patent No. 2,629,340, further identified in the foregoing, which is incorporated herein by reference. As described in that patent, the operation of the tying machine is fully automatic. Once set in motion the pick-up bar which receives the rolled shaped noodle at the output end of the rolling belts, is rotated through half revolutions intermittently to index one or the other of the receiving pockets 200 or 202 to a noodle receiving or delivery station alternately, for tying into a pretzel, under control of cams which program the operating steps in the noodle tying cycle. It should be readily appreciated that irregularity in time or position of delivery of the rolled noodle, will tend to reduce production by, at times, providing no noodles for tying during certain operating cycles, and at other times causing their breakage or mutilation. It should be understood that, while the pocket 200 or 202, as arranged in the pick-up bar P, is capable of accommodating a noodle somewhat displaced from the optimum receiving position, it cannot unfailingly receive, and properly perform its function on, noodles displaced to the degree found incident to the rolling of noodles of the wide variety of presently popular shapes and sizes. It has been found that the irregularity in time and position of noodle delivery, from the output of the noodle roller, to the input of the pretzel tier, is observable most frequently in noodles having central sections of relatively large diameter and relatively sharp taper toward their extremities. It has been found further that this is largely attributable to difficulty in properly centering the dough pellet as it starts its traverse at the input station of the rolling mechanism. While the symmetrically shaped double tapered cross sectional area of the space included between the lower run of the upper belt and upper run of the lower belt tends to promote regularity in time and position of delivery of the rolled noodle to the pretzel tier, when the dough pellet is inserted in the input of the noodle roller mechanism at or reasonably close to its lateral center, it has been found that the permitted variation from exact central insertion becomes less as the shapes and sizes of the required rolled noodle become more varied. The present invention corrects this difficulty by the introduction of further means which establishes a fixed output position and standardizes the time of delivery of the rolled noodle to the pretzel tier, for all noodles of a particular size and shape. The additional mechanism which produces these improvements, in cooperation with the newly designed upper rolling panels, will now be described.

Reference to FIG. 3 shows that upper input roller 24, at the dough pellet receiving station, has a concave central section 220. A third roller 222, fixedly secured to shaft 224, is rotatably mounted in vertically adjustable bearings, such as bearing 226, FIG. 1, secured in bearing mountings, such as mounting 228, projecting vertically from, and integral with, upper frame 32. Means are provided for varying the vertical position of the bearing 226, which means comprises vertical screws, fixedly secured in upper frame 32, surmounted by interiorly threaded caps 230 which engage the lower surface of bearings 226 in the mounting 228 on each side of frame 32. Roller 222 has a central convex section 240. Upper output roller 26 has a concave central section 242. Due to the vertical adjustability of roller 222, with its central convex section 240, the upper continuous belt 22 is drawn tightly over rollers 24, 26 and the upper belt 20 conforms smoothly to the concave central sections of input roller 24 and output roller 26.

As shown in FIG. 1, rollers 24 and 34 are provided with means for horizontal adjustment, to control the tension applied to belts 20 and 22. The adjusting means so closely resembles the means described for adjusting the vertical roller 222 that it is considered that it is not necessary to describe this adjusting means in detail.

Figure 4:
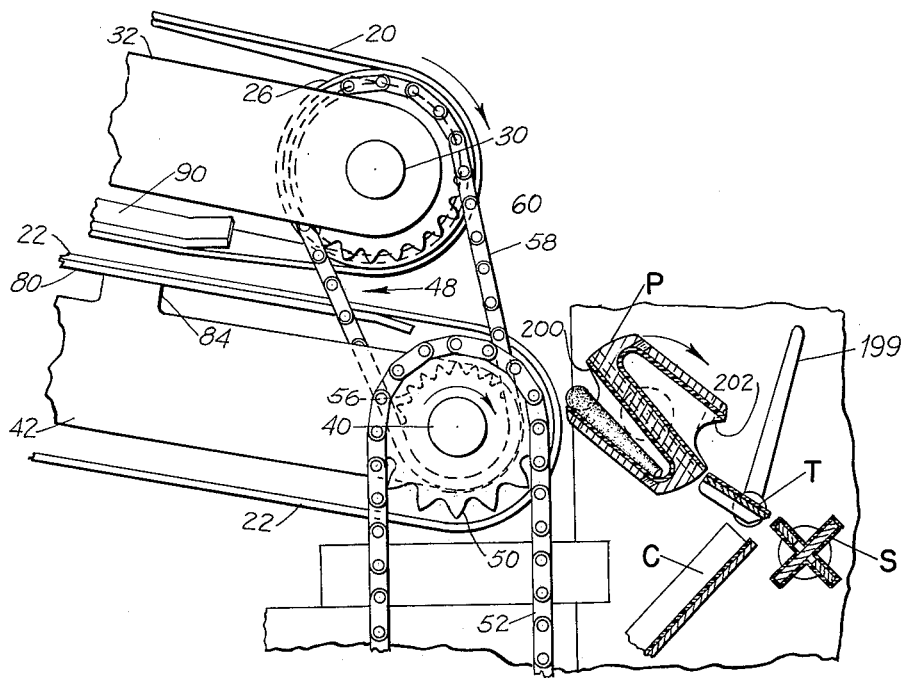
FIG. 4 is a partial side elevation of the delivery end of the pretzel noodle rolling apparatus showing, in enlarged scale, cooperating elements of the pretzel tying mechanism in section.

From the pockets 200 and 202 of the pick-up bar P, FIG. 4, the noodles are ordinarily directed by means of the plate T to the star wheel S for processing into a tied pretzel form for baking. In case of trouble, the plate T may be actuated by a hand lever 199 or through other mechanism, not shown, to divert the pretzel noodles into chute C, which directs them into a channel whereby they may be returned to the pretzel tying machine for further processing. Patent No. 2,629,340 contains a full detailed description of the pick-up bar P, the plate T, the star wheel S and the chute C, to which the reader is referred for knowledge of how they cooperate with the present improved noodle roller.

Attention is now particularly called to the flat truncated wedge shaped central panel section 86 of the rolling board of the upper frame. As the dough pellet is delivered to the input receiving station, and proceeds toward the output, during the rolling process, it is reduced in section and elongated, due to the reduction in height of the rolling channel between the belts 20 and 22, from left to right, as seen in FIG. 1. As the central section of the noodle is elongated, the diameter throughout its length, although reduced as it progresses toward the right, nevertheless remains uniform. The cross section of the two tapered end sections, of course, decreases progressively toward their extremities throughout the entire rolling. The flat truncated wedge shaped central section 86 of the rolling board, progressively widening in the direction from input to output, permits the progressive elongation of the central portion of the noodle, while retaining its diameter uniform in each transverse position between the belts. It has been found that this, coupled with the concave central section of the input and output rollers, promote transverse stabilization of the noodle. Attention is also called to the central concave section of the output roller, the length of which is correlated to the width of the right-hand end of central section 86. While the contour of the upper output roller 26 does not conform precisely to the contour of the noodle immediately after it has passed beyond the right-hand end of the three panel upper rolling board, it has been found that an output roller shaped as is output roller 26, with its concave section juxtaposed the right-hand end of the horizontal truncated wedge-shaped section 86, is better adapted to centralizing noodles, in the wide variety of presently popular sizes and shapes, in position adjacent the receiving pocket 200 or 202 of pick-up bar P, than one output roller precisely shaped to receive a noodle of some one fixed size and shape. In other words, in combination with the other rolling mechanism, the output roller, with its concave central section, is quite flexible in performing its function in the delivery of rolled noodles of many shapes and sizes. The explanation probably is that, notwithstanding its position above the rolled noodle, the concave central section serves as a pocket, into the deepest central portion of which the middle portion of noodles of many shapes and sizes tend to slide and be centered thus eliminating the need for modeling of the output roller to conform to each shape and size which might otherwise be required for improved centering and delivery to the pretzel tier.

For noodles of certain sizes and shapes, it has been found desirable to provide a central concave section in the lower output roller 36, together with means to make lower belt 22 conform thereto, to insure centralized delivery of such noodles to the pretzel tying machine. And at times, it will be found beneficial to employ two coacting output rollers, each having concave noodle directing sections, indexed to noodle receiving means in the pretzel tying machine. However, an upper roller having a concave section, such as described herein is entirely adequate except in exceptional cases.

The pick-up bar P, the plate T, the star wheel S and the chute, are coated with "Teflon" as indicated in the drawings. Teflon is the proprietary name of a substantially frictionless substance produced by E. I. du Pont de Nemours & Co.

What is claimed is:

1. A machine having instrumentalities for rolling dough pellets into noodles, for delivery to the input of a pretzel tier, said instrumentalities comprising a first and a second roller, each of said rollers having a concave central section, an endless belt rolling on said rollers, means for conforming said belt to said concave sections, said conforming means being a third roller disposed between said first and second rollers, said third roller having a convex section, and means coacting with said third roller for tensioning said belt in the area between said concave sections on said first and second roller.

2. In combination, instrumentalities comprising a pretzel noodle rolling mechanism and a pretzel noodle tier receiving mechanism, said receiving mechanism comprising a noodle pick-up bar having a noodle receiving pocket therein, said rolling mechanism comprising a first and a second frame, each of said frames having an input roller and an output roller thereon, a first and a second continuous belt, each of said belts rolling over a respective one of said input and output rollers on said first and said second frame, a single relatively shallow elongated transverse concavity spaced substantially from each end of said input and output roller on one of said frames, means for conforming said belt, individual to said rollers having said depressed section, to said depressed section, whereby said rolling mechanism delivers rolled noodles to an optimum position on said receiving pocket for tying said noodle into a pretzel.

3. Instrumentalities in accordance with claim 2 in which said rolling mechanism comprises a multi panel rolling board surmounting one of said belts, said multi panels comprising a horizontal flat truncated wedge shaped central panel section and two other panel sections flexibly attached to the lateral edges of said central section, and means for adjusting the vertical position of said two other panel sections, said latter means comprising means for elevating or lowering the outer edges of said two other panels.

4. A machine having a combination, instrumentalities for rolling a dough pellet into a pretzel noodle, said instrumentalities including closely juxtaposed, oppositely directed, continuously running, substantially horizontal belts, each of said belts having a rolling board backing it, one of said boards having a central horizontal section which widens substantially in the direction of the rolling of said pellet, said central section flanked on each side by a section which narrows substantially in the direction of the rolling of said pellet and tapers toward its respective lateral edge, for changing the shape of the cross section of the rolling space between said belts correlated to the contour desired in the noodle rolled therein, a dough pellet input station in said machine, said station comprising a substantially horizontal cylindrical input roller, said roller having a single medial relatively shallow elongated concavity spaced substantially from its ends, to receive said pellet and centralize it laterally on said belts.

5. A machine in accordance with claim 4, said machine having an output station indexed to a pretzel noodle receiver in a pretzel tying machine, said output station comprising a substantially horizontal cylindrical output roller, said output roller having a single medial relatively shallow elongated transverse concavity spaced substantially from its ends, to tend to direct said noodle centrally of said receiver.

6. A machine for rolling dough pellets into noodles for delivery to the input of a pretzel tier, said machine comprising two continuous belts, each of said belts operating over an individual pair of horizontal rollers, whereby one of said belts overlies the other and a needle rolling and shaping run is formed therebetween, a dough pellet input station near one end, and a dough noodle output station near the other end of said belts, a medial concavity formed in each roller of one of said pairs of rollers, for centering said noodles, a belt shaper individual to one of said belts for shaping said belt to conform to said concavities, said shaper being another roller intermediate said pair having said medial concavity, said other roller having a medial convexity.

7. A machine for rolling dough pellets into noodles for delivery to the input of a pretzel tier, said machine having opposed horizontal continuous belts disposed to form a noodle rolling run therebetween, one of said belts having medial concavities near each of its ends for centering said noodles, and means for forming a convexity in said one belt intermediate said ends of tend to tighten said one belt and to smoothen said concavities.

8. In the baking industry, a machine for rolling dough pellets of various first sizes into noodles of various second sizes, different from said first sizes, said machine having means for delivering the noodles to an optimum position at the input of a pretzel tier, notwithstanding said variations, means in said machine for reducing the cross-sectional area and increasing the length of the noodles materially during rolling, said machine having an input station for receiving said pellets and an output station for delivering said noodles to said tier, a roller at each of said stations, a continuous belt operable over said rollers between said stations, a medial concavity in said belt and roller at each of said stations for centering said pellet and said noodle, the concavity in said roller at said output station being longer than the one at said input station to accommodate the noodle elongation.

References Cited in the file of this patent

UNITED STATES PATENTS

| 873,396 | Walters | Dec. 10, 1907 |
| 1,537,018 | Lauterbur | May 5, 1925 |
| 2,881,715 | Heim | Apr. 14, 1959 |

FOREIGN PATENTS

| 137,511 | Germany | Dec. 22, 1902 |

OTHER REFERENCES

German application, 1,082,202, printed May 25, 1960.